(12) United States Patent
Jennings et al.

(10) Patent No.: US 7,396,287 B2
(45) Date of Patent: Jul. 8, 2008

(54) BLIND RIVET

(75) Inventors: Gary Jennings, Birmingham (GB); Peter C Probert, Sutton Coldfield (GB)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 11/541,943

(22) Filed: Oct. 2, 2006

(65) Prior Publication Data

US 2007/0147971 A1 Jun. 28, 2007

Related U.S. Application Data

(63) Continuation of application No. 10/004,552, filed on Dec. 5, 2001, now abandoned.

(30) Foreign Application Priority Data

Dec. 21, 2000 (GB) ............................... 0031251.2

(51) Int. Cl.
*B21K 1/58* (2006.01)

(52) U.S. Cl. .......................... 470/29; 470/28

(58) Field of Classification Search .................... 411/34, 411/38, 40, 41; 470/28, 29, 110, 147, 27, 470/31, 33
See application file for complete search history.

(56) References Cited

U.S. PATENT DOCUMENTS

| | | | |
|---|---|---|---|
| 1,365,719 A | 1/1921 | Ogden | |
| 2,324,142 A | 7/1943 | Eklund | |
| 2,385,831 A * | 10/1945 | Mullgardt | 470/29 |
| 3,414,965 A * | 12/1968 | Siebol et al. | 29/509 |
| 3,426,375 A * | 2/1969 | Jeal | 470/2 |
| 3,463,046 A * | 8/1969 | Wendt et al. | 411/34 |
| 4,958,971 A | 9/1990 | Lacey | |
| 5,496,140 A | 3/1996 | Gossmann | |
| 6,254,324 B1 | 7/2001 | Smith | |

FOREIGN PATENT DOCUMENTS

| | | |
|---|---|---|
| DE | 84 30 648 U | 11/1984 |
| EP | 0 168 355 A | 1/1986 |
| EP | 0 677 666 A | 10/1995 |
| EP | 1 030 069 A2 | 8/2000 |

\* cited by examiner

*Primary Examiner*—Edward Tolan
(74) *Attorney, Agent, or Firm*—Harness, Dickey & Pierce, P.L.C.

(57) ABSTRACT

A blind rivet formed with a tubular shell, and a mandrel extending through the shell. The shell has an outwardly extending flange at one end forming a rivet head, and having a first set of radial indentations arranged around the periphery of the shell at a first distance from the rivet head, and a second set of radial indentations arranged around the periphery of the shell at a second distance from the rivet head. Each of the radial indentations are formed by crimping them in the rivet shell after the shell has been positioned around the mandrel with the end of the shell remote from the rivet head defining the blind end of the rivet shell. Lastly, the mandrel having a head formed at one end to abut against the blind end of the shell, and the stem extending from the head having a point of weakness part way along the length thereof disposed within the shell.

8 Claims, 4 Drawing Sheets

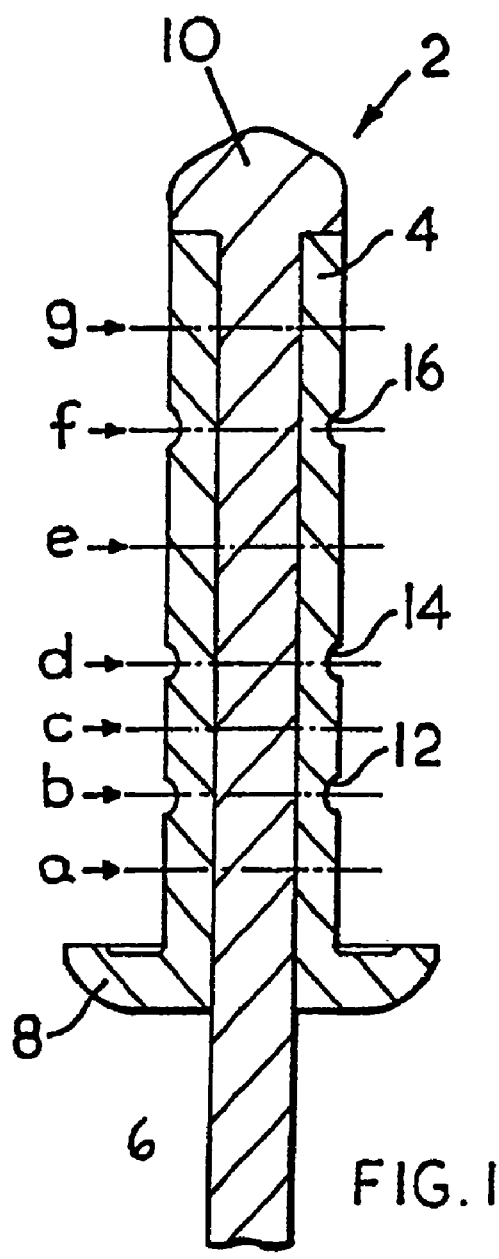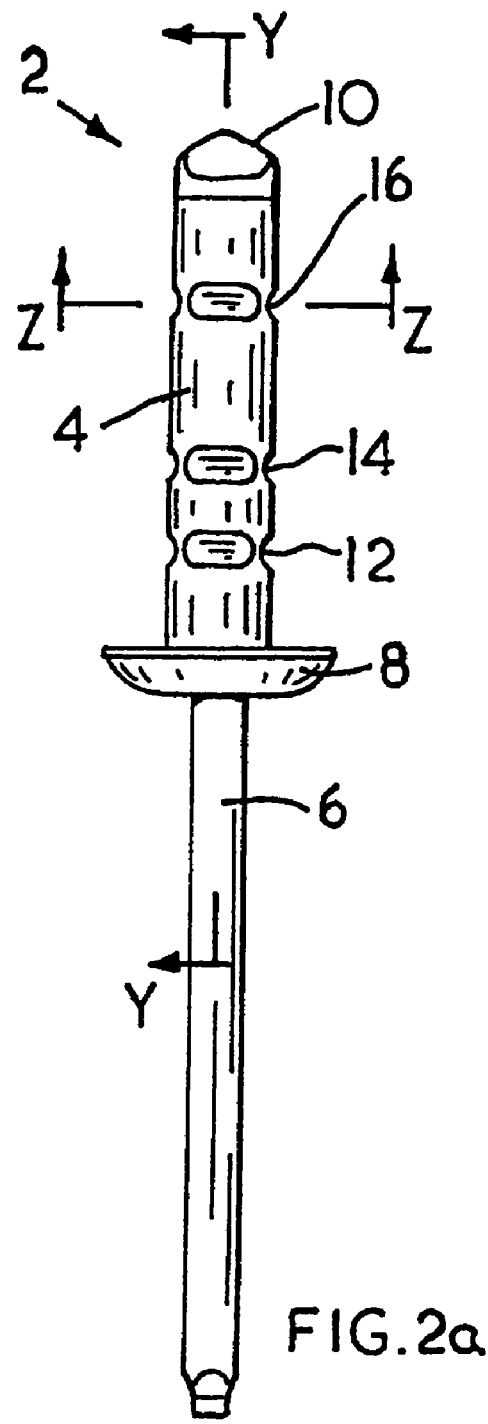

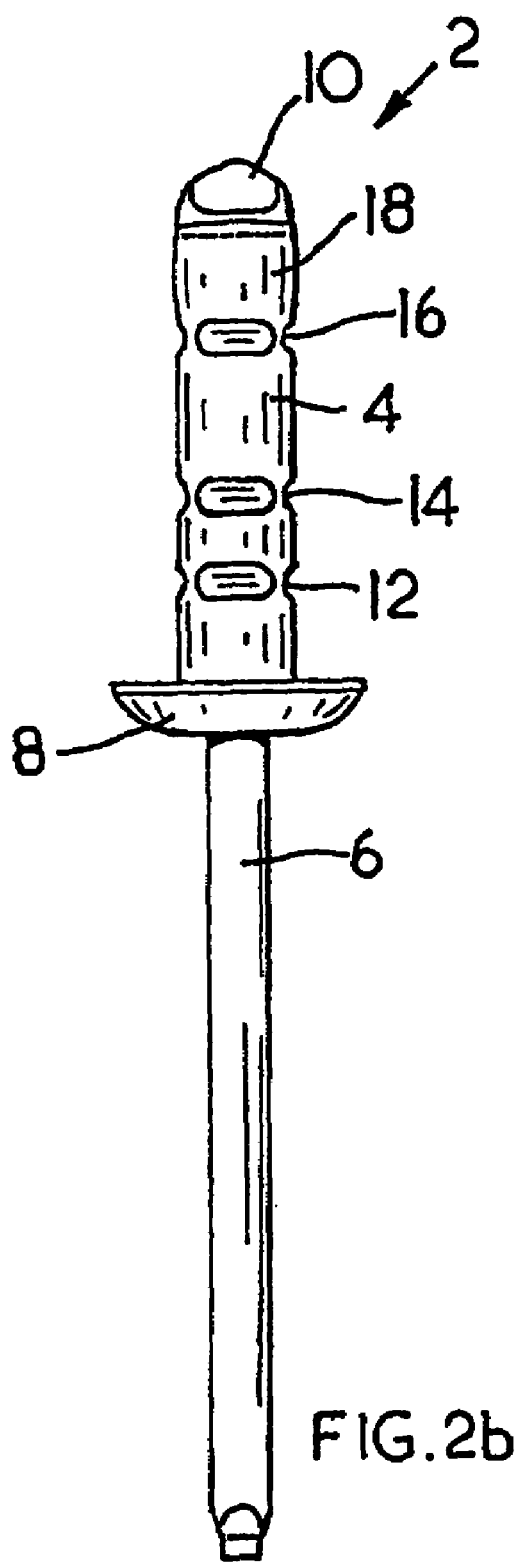
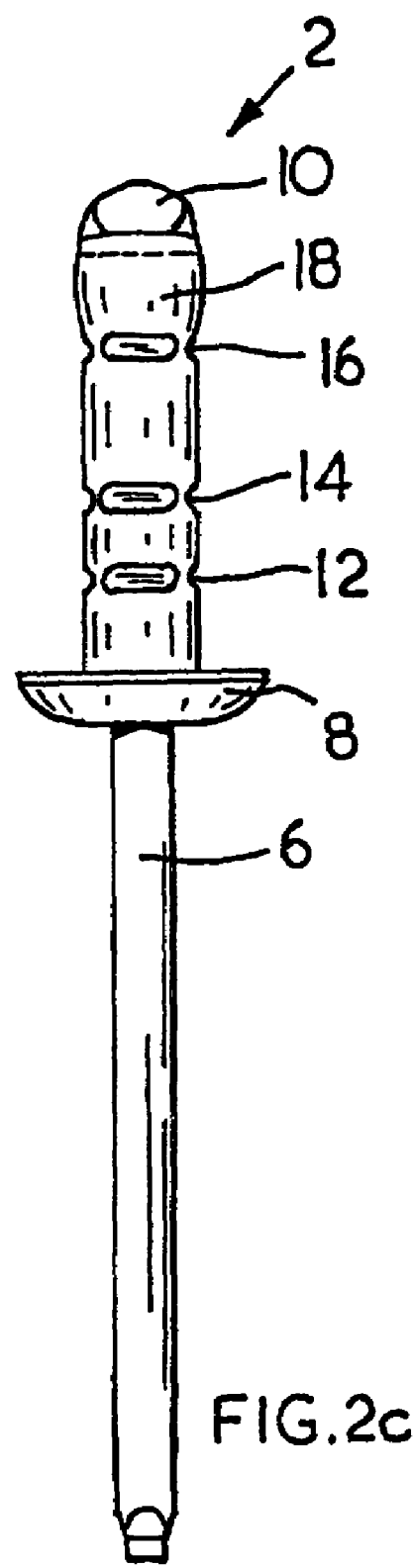
FIG. 2b                    FIG. 2c

BLIND RIVET

CROSS-REFERENCE TO RELATED APPLICATIONS

This application is a continuation of U.S. patent application Ser. No. 10/004,552 filed on Dec. 5, 2001 now abandoned. U.S. patent application Ser. No. 10/004,552 claims the benefit of Great Britain Application No. 00 312 51.2, filed Dec. 21, 2000. The disclosure of the above applications is incorporated herein by reference.

FIELD

This invention relates to a blind rivet, and more especially to a blind rivet comprising a tubular shell and a mandrel extending through the shell.

BACKGROUND

The statements in this section merely provide background information related to the present disclosure and may not constitute prior art.

One particular type of blind rivet is known as a multigrip rivet. A typical rivet of this type comprises an outer tubular shell having circumferential grooves spaced at intervals along its length, and a mandrel, having a radially enlarged head at one end, extending through the shell. The shell also usually has a radially extending head, which acts against one face of a workpiece. To set the rivet, the mandrel is pulled axially relative to the shell, while supporting the shell head, causing the enlarged head of the mandrel to urge against the opposed end face of the tubular shell. The circumferential grooves in the tubular shell are thereby caused to collapse in an axial direction, securing the workpiece components together, and finally the portions of the shell between the grooves are caused to expand radially to form a characteristic "cottage loaf" shape, or "cottage loaf set". The rivet thereby holds the workpiece components together and fills the hole in the workpiece through which it passes.

In the prior art, one type of multigrip rivet has a tubular shell with a profiled exterior shape in which there are two axially spaced regions of reduced diameter. The reduced diameter regions are produced by deforming the shell inwardly, after the mandrel has been inserted into the shell, by means of a crimping operation (i.e. using radially inwardly moving dies) or a rolling operation.

U.S. Pat. No. 5,496,140 describes another known blind rivet. It comprises an outer tubular shell, and a mandrel extending therethrough. In this case the outer shell is provided with one or two sets of recesses, the recesses of each set being arranged in a circumferential direction, spaced apart from each other, and essentially in the same axial position. The bottoms of the recesses form a secant with respect to the cylindrical circumference of the rivet shell.

Blind rivets are often required to operate in oversized holes, and in a variety of grip thicknesses. Some of the known blind rivets can perform well in such conditions, the multigrip nature of the "cottage-loaf" shape deformation also being capable of adjusting to oversize holes, and the variety of grip thicknesses; this being achieved by appropriate positioning of the circumferential grooves or recesses in the shell. However, particularly when operating at the extremes of grip thickness or oversize holes, groove or recess depth is critical; if the grooves are too deep they will cause cracking or even fracture of the rivet body; but if the grooves are too shallow they will not provide sufficient resistance to prevent the mandrel head from pulling into or even through the mandrel body. These problems are exacerbated where the workpiece materials to be secured are soft (since the grooves need to be deeper in the rivet shell to prevent mandrel head pull-through), or friable (since the rivet is more likely to promote cracking or fracture when set, especially if the mandrel head pulls into the rivet body), and/or if the surface of the rivet is coated with a low friction material such as PTFE (polytetrafluoroethylene), this sometimes being done to provide enhanced abrasion or corrosion resistance.

Cracking or fracture of the rivet shell is obviously undesirable since it results in a failed or at least a significantly weakened connection. Passage of the mandrel head into, or through the rivet shell is also undesirable. If the mandrel head pulls into the rivet shell it causes radial expansion of the rivet shell between the grooves, resulting in splitting of the workpiece material. If the mandrel head can pull completely through the rivet shell the result is that the mandrel head shaft portion can protrude beyond the flange giving a potentially hazardous condition.

We have observed that while the prior art blind rivets function in oversize holes and in a variety of grip thicknesses, they do not perform reliably when the conditions are exacerbated by the use of soft or friable materials as the workpiece components, or when the rivet itself is provided with a low surface friction coating.

We have further discovered that performance of all rivets, and particularly the performance of rivets when set in soft or friable workpieces, and the performance of low friction coated rivets in these and other workpieces, can be significantly improved by providing a rivet shell having sets of radial indentations rather than the circumferential groove or secant shaped recesses of the prior art.

SUMMARY

Accordingly a first aspect of the present invention provides a blind rivet comprising a tubular shell, and a mandrel extending through the shell, wherein:

(i) the shell has an outwardly extending flange at one end forming a rivet head, and comprises a first set of radial indentations arranged around the periphery of the shell at a first distance from the rivet head, and a second set of radial indentations arranged around the periphery of the shell at a second distance from the rivet head, the radial indentations having been formed by crimping into the rivet shell after it is positioned on the mandrel;

the end of the shell that is remote from the rivet head being the blind end of the rivet shell; and (ii) the mandrel having a head at one end which abuts against the blind end of the shell, and a stem extending from the head, the stem having a point of weakness part way along its length.

Another aspect of the invention provides a method of securing two or more workpiece components together using a blind rivet according to the invention, the method comprising (a) positioning the blind rivet such that the mandrel of the blind rivet extends through substantially aligned apertures in the workpiece components, and (b) moving the mandrel axially relative to the shell such that the head of the mandrel abuts against the blind end of the shell, thereby causing the portions of the shell between the indentations to expand radially, and the radial indentations in the shell to collapse, whereby the workpiece components are held together and the apertures in the workpiece components are substantially filled.

The invention also provides a blind rivet positioned, and preferably set, within substantially aligned apertures of two or more workpiece components.

In preferred embodiments the blind rivet comprises a third set of indentations arranged around the periphery of the stem at a third distance from the rivet head. Where there are three sets of indentations the spacing between adjacent sets of indentations may be the same or different. Preferably each set of indentations is at least 2 mm, more preferably at least 3 mm from its adjacent set(s) of indentations. In preferred embodiments the first set of indentations are positioned 3 to 5 mm from the shell flange, the second set of indentations are arranged at 6.5 to 8.5 mm from the shell flange, and the third set of indentations, if present, are positioned 12.5 to 14.5 mm from the shell flange.

The formation of the radial indentations by crimping introduces work hardening around each crimped indentation. In a preferred embodiment the hardness of the rivet shell in the region of the indentations is at least 20%, preferably at least 30% higher than the hardness of the rivet shell at a point midway between adjacent sets of longitudinally spaced indentations.

The proposed rivet of the invention is particularly useful where used in securing soft and pliable materials, for example for securing various of such soft and pliable materials as used in the mud-flaps or stone guards in automobiles. Examples of typical softer materials that can advantageously be secured using the present invention include rubbers and elastomeric based plastics.

The proposed rivet of the invention is also particularly useful for securing friable plastics components, for instance friable plastics components used in speaker components in automotive applications. Examples of friable materials that can advantageously be secured using the present invention include polycarbonate and styrene based polymers.

Any suitable material may be used for the rivet shell and mandrel. The materials may be the same or different. As examples of suitable materials, there may be mentioned aluminum alloy rivet bodies and mandrels, stainless steel rivet bodies and mandrels and steel rivet bodies and mandrels, and differing combinations of these materials.

The radial indentations in the rivet shell are formed by a crimping process. The process is advantageously a radial crimping process. The nature of the radial crimping process of the invention allows indentation depth to be precisely controlled. Typically, the depth of an indentation, prior to the setting process, is in the range 0.20 to 0.26 mm, preferably about 0.23 mm, with a tolerance of less than 0.030 mm, preferably less than 0.020 mm, especially preferably less than 0.015 mm. Usually, the depth of an indentation is 15 to 30%, preferably 20 to 25% of the thickness of the shell, prior to the setting process.

Typically, each set of radial indentations comprises between two and eight individual indentations. Preferably the shape of each indentation is generally circular with outwardly sloping edges, or angled flanks. This shape helps to force the rivet shell into tight assembly with the mandrel. It also introduces work hardening.

Further areas of applicability will become apparent from the description provided herein. It should be understood that the description and specific examples are intended for purposes of illustration only and are not intended to limit the scope of the present disclosure.

DRAWINGS

Embodiments of the invention will now be described, by way of example, with reference to the accompanying drawings, wherein:

FIG. 1 is a longitudinal section through a blind rivet according to the invention, showing the hardness at various points a to g along the rivet;

FIGS. 2a to 2e are side elevational views of the blind rivet of FIG. 1, at sequential stages in the setting process of the blind rivet;

FIG. 4a is a cross-sectional view of the rivet of FIG. 2a, taken along the line Z-Z of FIG. 2a.

DETAILED DESCRIPTION

Figure 2D:
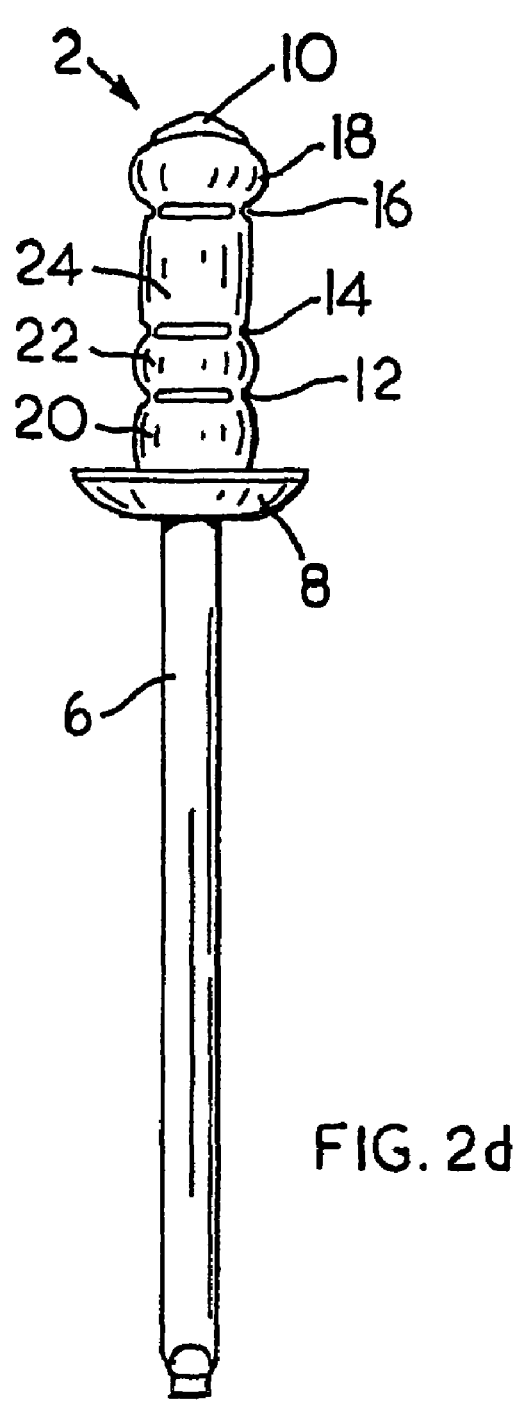

The following description is merely exemplary in nature and is not intended to limit the present disclosure, application, or uses.

Referring to the drawings, FIG. 1 shows a blind rivet 2 according to the invention. It comprises a hollow substantially cylindrical shell 4, and a solid substantially cylindrical mandrel 6 extending through the shell. The shell has an outwardly extending flange 8 at one end forming a rivet head. The mandrel 6 also has a head 10 at the end of the mandrel which abuts the blind end of the shell 4, remote from the head 8 of the shell. The shell 4 comprises a first set of four radial indentations 12 spaced at a distance of 4 mm from the shell flange 8, the said four indentations being uniformly spaced around the circumference of the shell 4, at the same longitudinal separation of 4 mm from the flange 8 of the shell 4. The shell also comprises a second set of four radial indentations 14, similarly uniformly spaced around the circumference of the shell, at a distance of 7.5 mm from the shell flange 8, and a third set of four radial indentations 16, also similarly uniformly spaced around the circumference of the shell, this time at a distance of 13.7 mm from the shell flange 8. Each set of radial indentations is produced by a radially applied crimping process after assembly of the mandrel 6 within the shell 4. During the crimping process material is displaced, some radially inwardly to touch the mandrel 6, but most being displaced longitudinally. The control of the depth of the radial crimping can be accurately controlled by virtue of the mechanically controlled crimping dies that are preferably used. Such a radial crimping process gives more precise depth control that the roll method of grooving which has commonly been used in the manufacture of prior art multigrip rivets; roll methods of grooving being influenced by the hardness of the rivet body material and flexibility in the roll forming mechanisms. Similarly it is known that the rolling of stainless steel and PTFE coated aluminum is more difficult and the indentation by crimping method of the present invention can achieve a high degree of consistency and accuracy in these and other materials.

The blind rivet of FIG. 1 was sectioned longitudinally along its centre line, prepared metallographically and a micro-hardness profile carried out. Table 1 below shows the hardness values of the shell 4 at points (a) to (g) as marked on FIG. 1, being various distances from the shell flange 8. The term MHV 0.5 as used in Table 1 means Micro Hardness Value with a 500 g applied indent load.

TABLE 1

| Point | Distance from shell head 8 in mm | Hardness MHV 0.5 | Comment |
|---|---|---|---|
| a | 2.0 | 63.5 | |
| b | 4.0 | 86.6 | Position of first set of radial indentations 12 |
| c | 5.8 | 65.2 | |
| d | 7.5 | 87.9 | Position of second set of radial indentations 14 |
| e | 10.6 | 67.1 | |
| f | 13.7 | 90.2 | Position of third set of radial indentations 16 |
| g | 19.9 | 65.7 | |

As can be seen from the table the hardness value of the shell 4 of the rivet is significantly higher in the vicinity of each of the sets of radial indentations than at positions away from the radial indentations. Indeed the hardness in the vicinity of the radial indentations is more than 30% higher than at positions longitudinally between the sets of radial indentations. The increased hardness is thought to be caused by local work hardening resulting from the radial crimping process.

Figure 2E:
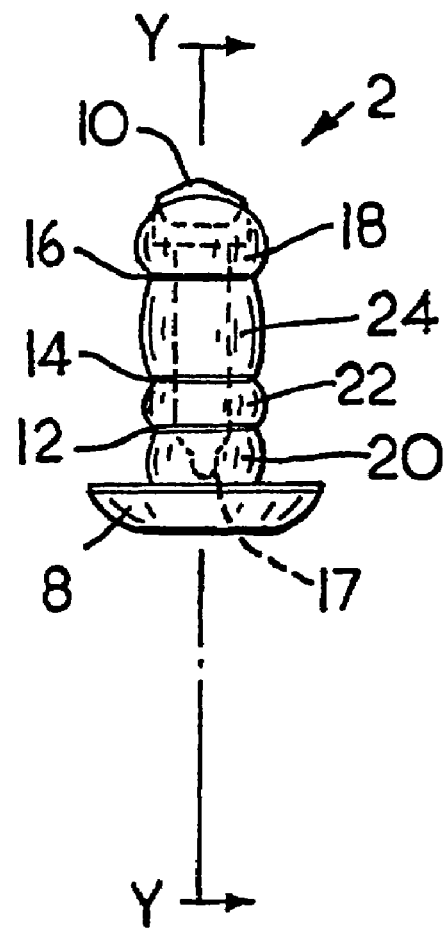
Figure 3A:
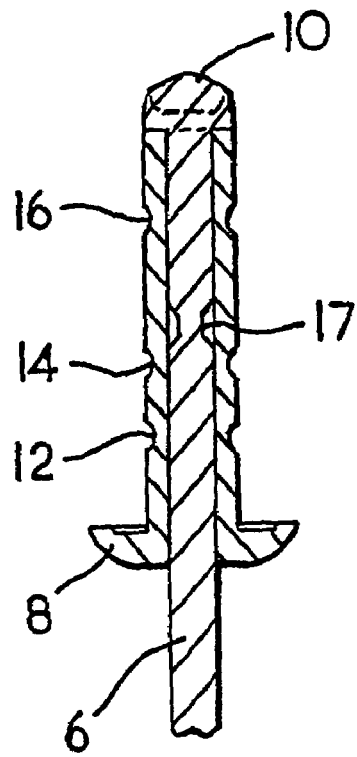
FIGS. 3a and 3e are side sectional views through the blind rivet of FIGS. 2a and 2e respectively, taken along line Y-Y (shown in FIG. 2a) in each case.
Figure 3E:
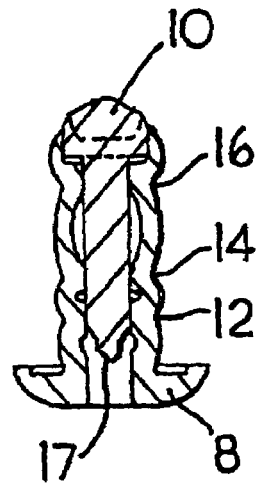

Turning now to FIGS. 2a to 2e, and 3a and 3e, these show sequential steps in the blind rivet setting process. FIG. 2a shows the position prior to setting. FIG. 3a, which is a longitudinal section also prior to setting, shows that the mandrel 6 has a predetermined point of weakness provided by a thinned section 17. This is positioned longitudinally between crimped indentations 14 and 16 of the shell, prior to the setting process. FIG. 2b show the initial stage of setting. The mandrel head 10 has started to enter the rivet shell 4 causing locally greater swelling in the region 18 between the mandrel head 10 and the first indentation 16 of shell 4. The work-hardened material in the vicinity of the radial indentations 12, 14, 16 tends to prevent axial collapse of the shell in the region of the indentations at this stage, so that the mandrel head movement causes material swelling in the regions between the indentations. In FIG. 2c the head 10 has moved further into shell 4 and further swelling of region 18 of the shell has taken place. In FIG. 2d the mandrel head 10 is almost fully entered into the rivet shell 4. Radial swelling of the shell 4 in region 20, between the shell flange 8 and the first set of indentations 12, and in region 22, between the first and second sets of radial indentations 12 and 14 has now occurred in addition to further swelling of region 18. There is some swelling of region 24 between the second and third sets of indentations 14 and 16, but this is less than in the other regions 18, 20 and 22, because of the greater longitudinal separation between indentations 14 and 16 compared with the separation between head 10 and indentations 16, or between flange 8 and indentations 12, or between indentations 12 and 14. At this stage the indentations 12, 14 and 16 have also started to collapse axially. The extent of the entry of the mandrel head 10 is limited by the position of the nearest set of crimped indentations from the mandrel head 10, i.e., the position of the third set of indentations 16. At the setting stage shown by FIG. 2d, and also in the final set stage shown in FIG. 2e, the mandrel head is not only fully entered but also locked into the rivet shell 4. This locking can be best seen from the longitudinal section of FIG. 3e, where gripping contact is made between the shell 4 and the mandrel 6 in the region of each of the collapsed radial indentations 12, 14 and 16.

At this stage also, since the lower part 20 of the rivet shell 4 is expanding, it can fill an application hole in workpiece components, into which a rivet of this type is typically placed. Typical holes may have a diameter in the range 4 to 6 mm for example.

The amount of axial collapse is controlled by position of the lowest set of radial indentations 12 relative to the flange 8 on the shell 4. This gives the minimum plate setting, i.e., the minimum thickness of plates which the rivet can secure. Typically the plate thickness may be in the range 2 mm to 13.5 mm, depending on the length of the rivet.

FIG. 2e shows the fully set position. At this point the crimped indentations 12, 14, 16 have completely axially collapsed. This is best seen by looking at sectional view of FIG. 3e. The collapse of the indentations effectively stops any further longitudinal collapse of the rivet shell 4, and firmly locks the mandrel 6 in place. At this stage the lower end of the mandrel 6 breaks off at the break point 17, while the head 10 of the mandrel and the shank portion below the head are retained and locked within the rivet shell 4.

Figure 4A:
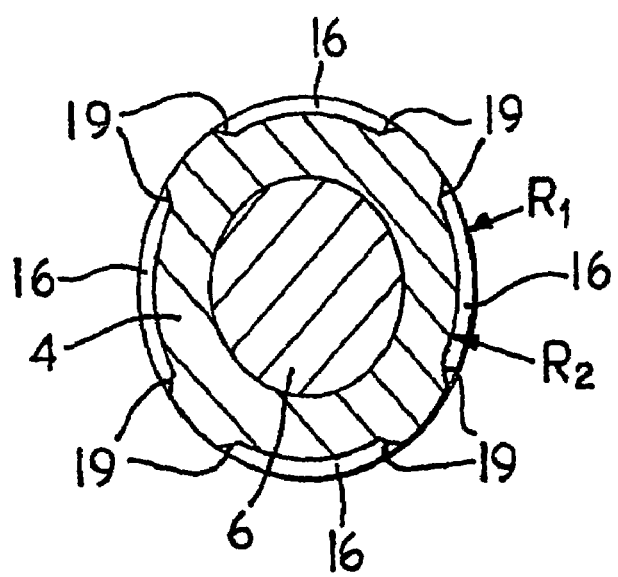

FIG. 4a is a cross-sectional view through the line Z-Z of FIG. 2a. From this view the shape of each set of radial indentations 16 can be seen. Each indentation 16 is generally circular in shape with angled flanks 19. This shape helps to force the rivet shell 4 into a tight assembly with a mandrel 6. At the same time it introduces local work hardening, as described with reference to FIG. 1 and Table 1. The outer radius of the shank of the shell of the rivet, indicated by reference $R_1$ in FIG. 4a is 2.38 mm, and the inner radius of the indentation (i.e. from the centre of the shell to the base of the indentation), indicated by reference $R_2$ in FIG. 4a, is 2.15 mm. The depth of the indentation is therefore 0.23 mm.

In general, the above identified embodiments are not to be construed as limiting the breadth of the present invention. It will be understood that modifications or other alternative constructions may become apparent within the scope of the invention as defined in the appended claims.

What is claimed is:

1. A method of manufacturing a multi-grip blind rivet, the method comprising:
    placing a mandrel through a shell, the mandrel abutting against a blind end of the shell and having a head and a stem extending from the head, the stem having a point of weakness part way along its length and disposed within the shell, the shell having an outwardly extending flange at one end forming a rivet head;
    crimping the shell around the periphery of the shell at a first distance from the shell flange so as to form a first plurality of radial indentations such that when viewed in cross section through the length of the indentations the radial indentations are arc shaped; and
    crimping the shell around the periphery of the shell at a second distance from the flange so as to form a second plurality of radial indentations such that when viewed in cross section through the length of the indentations the radial indentations are arc shaped, and so as to cause the hardness of the shell is between about 20% and 30% higher than the hardness of the shell at a point mid way between the first plurality of indentations and the second plurality of indentations, said shell being configured to plastically deform at the midway point during setting.

2. The method of claim 1 further comprising crimping at least a third plurality of indentations around the periphery of the shell at a third distance from the flange.

3. The method of claim 2 wherein crimping at least a third plurality of indentations creates a curved intermediate surface having an exterior radius as located radially in between the third plurality of indentations.

4. The method of claim 1 wherein crimping the shell is crimping the shell to form an indentation having a depth of at least 0.20 mm.

5. The method of claim 4 wherein crimping the shell is crimping the shell to form an indentation having a depth which is at least 20 to 25% of the thickness of the shell.

6. The method of claim 5 wherein the plurality of radial indentations is between two to eight indentations.

7. The method of claim 6 wherein crimping the shell is crimping the shell to form radial indentations having a circular surface with outwardly sloping edges.

8. A method of manufacturing a multi-grip blind rivet, the method comprising:
- placing a mandrel through a shell, the mandrel abutting against a blind end of the shell and having a head and a stem extending from the head, the stem having a point of weakness part way along its length and disposed within the shell, the shell having an outwardly extending flange at one end forming a rivet head;
- crimping the shell around the periphery of the shell at a first distance from the flange so as to form radial indentations such that when viewed in cross section through the length of the indentations the radial indentations are arc shaped;
- crimping the shell around the periphery of the shell at a second distance from the flange so as to form radial indentations such that when viewed in cross section through the length of the indentations the radial indentations are arc shaped; and
- creating an intermediate surface located radially in between the radial indentations when viewed in cross section through the length of the indentations, the intermediate surface being defined by a first sloping edge, a second sloping edge and a mid-portion between the first and second sloping edges, said mid-portion having a curvature equal to an exterior radius of the shell, wherein the radial indentations have a thickness between about 15 to about 30% of the shell thickness.

* * * * *